US010514547B2

(12) United States Patent
Jarvenpaa (10) Patent No.: US 10,514,547 B2
(45) Date of Patent: Dec. 24, 2019

(54) APPARATUS AND METHOD FOR PROVIDING AN IMAGE

(71) Applicant: Nokia Technologies Oy, Espoo (FI)

(72) Inventor: Toni Jarvenpaa, Toijala (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/309,902

(22) PCT Filed: May 12, 2015

(86) PCT No.: PCT/FI2015/050317
§ 371 (c)(1),
(2) Date: Nov. 9, 2016

(87) PCT Pub. No.: WO2015/173470
PCT Pub. Date: Nov. 19, 2015

(65) Prior Publication Data
US 2017/0235146 A1    Aug. 17, 2017

(30) Foreign Application Priority Data
May 13, 2014   (GB) .................................... 1408412.3

(51) Int. Cl.
*G02B 27/01* (2006.01)
*G02B 27/00* (2006.01)
(Continued)

(52) U.S. Cl.
CPC ..... *G02B 27/0176* (2013.01); *G02B 26/0808* (2013.01); *G02B 27/0081* (2013.01); *G02B 27/0172* (2013.01); *G02B 27/0179* (2013.01); *G02B 27/022* (2013.01); *G02B 27/4205* (2013.01); *G02B 2027/0132* (2013.01); *G02B 2027/0154* (2013.01); *G02B 2027/0159* (2013.01)

(58) Field of Classification Search
CPC ........ G02B 27/0172; G02B 2027/0178; G02B 2027/0123; G02B 27/017; G02B 2027/0125; G02B 27/0081; G02B 6/00; G02B 5/18; G02B 2027/014; G02B 2027/0147; G02B 2027/015; G02B 27/4205; G02B 27/0176; G02B 27/022; G02B 26/0808; G02B 27/0179; G02B 2027/0159; G02B 2027/0154; G02B 2027/0132; G02B 2027/0161; G02B 2027/0163
USPC ... 359/633, 567, 631, 466, 13, 34, 629, 632, 359/857; 345/8, 7, 156; 362/625, 615; 385/115, 121, 37, 31
See application file for complete search history.

(56) References Cited

U.S. PATENT DOCUMENTS

| 2002/0167462 | A1* | 11/2002 | Lewis | ................ | G02B 27/0093 345/7 |
| 2010/0277803 | A1* | 11/2010 | Pockett | .............. | G02B 27/0172 359/567 |

* cited by examiner

*Primary Examiner* — William R Alexander
*Assistant Examiner* — Alberto J Betancourt
(74) *Attorney, Agent, or Firm* — Harrington & Smith (57) ABSTRACT

An apparatus and method wherein the apparatus includes an image source; an exit pupil configured to be positioned proximate to an eye of a user to enable a user to view an image from the image source; and a plurality of grating areas between the image source and the exit pupil wherein the plurality of grating areas are configured to direct beams of light from the image source to the exit pupil; wherein the image source is configured to be moved relative to the plurality of grating areas to control the position of the exit pupil relative to the eye of the user.

19 Claims, 5 Drawing Sheets

(51) Int. Cl.
*G02B 26/08* (2006.01)
*G02B 27/02* (2006.01)
*G02B 27/42* (2006.01)

APPARATUS AND METHOD FOR PROVIDING AN IMAGE

TECHNOLOGICAL FIELD

Examples of the disclosure relate to an apparatus and method for providing an image. In particular they relate to an apparatus and method for providing an image in a device such as a near eye display.

BACKGROUND

Devices such as near eye displays are known. Such devices enable images from image sources such as displays or scanners to be provided proximate to the eye of a user. Such devices may be used to implement virtual or augmented reality applications.

In such devices it is useful to align the exit pupils of the device with the pupils of the user. However, the distance between the pupils of the eyes of a user may differ between the different users of such devices. Therefore it is useful to enable the position of the exit pupils of such devices to be adjusted.

BRIEF SUMMARY

According to various, but not necessarily all examples of the disclosure, there may be provided an apparatus comprising: an image source; an exit pupil configured to be positioned proximate to an eye of a user to enable a user to view an image from the image source; and a plurality of grating areas between the image source and the exit pupil wherein the plurality of grating areas are configured to direct beams of light from the image source to the exit pupil; wherein the image source is configured to be moved relative to the plurality of grating areas to control the position of the exit pupil relative to the eye of the user.

In some examples the plurality of grating areas may comprise an in-coupling grating area and an out-coupling grating area. The in-coupling grating area may be configured so that a beam of light from the image source is only incident on a portion of the in-coupling grating area. The out-coupling grating area may be configured so that the exit pupil of the apparatus only comprises a portion of the out-coupling grating area. The image source may be configured to be moved between a first position and a second position such that when the image source is in the first position a beam of light is incident on a first portion of the in-coupling grating area and when the image source is in the second position the beam of light is incident on a second portion of the in-coupling grating area wherein the second portion of the in-coupling grating area is different to the first portion of the in-coupling grating area.

In some examples the path followed by a beam of light through the plurality of grating areas may be determined by the portion of the in-coupling grating area that the beam of light was incident upon. The position of the exit pupil may be determined by the path followed by the beam of light through the plurality of grating areas.

In some examples the plurality of grating areas may comprise at least one intermediate grating area between the in-coupling grating area and the out-coupling grating area. The at least one intermediate grating area may comprise a horizontal grating area. The intermediate grating area may be fixed in position relative to the out-coupling grating area.

In some examples the image source may comprise at least one display.

In some examples the apparatus may comprise a mechanism for moving the image source.

In some examples the apparatus may comprise a mechanism for moving at least one of the plurality of grating areas.

In some examples the plurality of grating areas may comprise at least one diffraction grating.

In some examples the plurality of grating areas may be provided on at least one exit pupil expander.

In some examples there may be provided an electronic device comprising an apparatus as described above.

According to various, but not necessarily all examples of the disclosure, there may be provided a method comprising: providing an image source; configuring an exit pupil to be positioned proximate to an eye of a user to enable a user to view an image from the image source; and providing a plurality of grating areas between the image source and the exit pupil wherein the plurality of grating areas are configured to direct beams of light from the image source to the exit pupil; wherein the image source is configured to be moved relative to the plurality of grating areas to control the position of the exit pupil relative to the eye of the user.

In some examples the plurality of grating areas may comprise an in-coupling grating area and an out-coupling grating area. The in-coupling grating area may be configured so that a beam of light from the image source is only incident on a portion of the in-coupling grating area. The out-coupling grating area may be configured so that the exit pupil of the apparatus only comprises a portion of the out-coupling grating area. The image source may be configured to be moved between a first position and a second position such that when the image source is in the first position a beam of light is incident on a first portion of the in-coupling grating area and when the image source is in the second position the beam of light is incident on a second portion of the in-coupling grating area wherein the second portion of the in-coupling grating area is different to the first portion of the in-coupling grating area.

In some examples the path followed by a beam of light through the plurality of grating areas may be determined by the portion of the in-coupling grating area that the beam of light was incident upon.

In some examples the position of the exit pupil may be determined by the path followed by the beam of light through the plurality of grating areas.

In some examples the plurality of grating areas may comprise at least one intermediate grating area between the in-coupling grating area and the out-coupling grating area. The at least one intermediate grating area comprises a horizontal grating area. The intermediate grating area may be fixed in position relative to the out-coupling grating area.

In some examples the image source may comprise at least one display.

In some examples the method may further comprise providing a mechanism for moving the image source.

In some examples the method may further comprise providing a mechanism for moving at least one of the plurality of grating areas.

In some examples the plurality of grating areas may comprise at least one diffraction grating.

In some examples the plurality of grating areas may be provided on at least one exit pupil expander.

According to various, but not necessarily all, examples of the disclosure there may be provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

The figures illustrate an apparatus 1 comprising: an image source 3; an exit pupil 11 configured to be positioned proximate to an eye 15 of a user to enable a user to view an image from the image source 3; and a plurality of grating areas 9 between the image source 3 and the exit pupil 11 wherein the plurality of grating areas 9 are configured to direct beams of light 13 from the image source 3 to the exit pupil 11; wherein the image source 3 is configured to be moved relative to the plurality of grating areas 9 to control the position of the exit pupil 11 relative to the eye 15 of the user.

Examples of the disclosure provide for an apparatus 1 and method which enables a device such as a near eye display to be adjusted. The apparatus 1 may be adjusted to take into account the fact that different users may have different distances between their pupils. This may enable the exit pupil 11 of the apparatus 1 to be provided adjacent to the eye 15 of the user.

Figure 1:
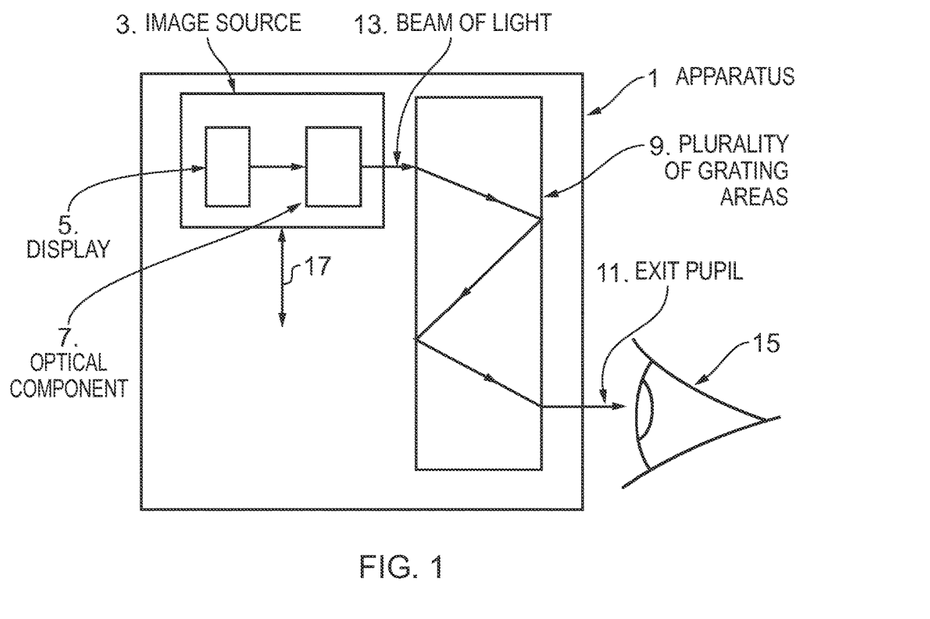
FIG. 1 illustrates an apparatus.

FIG. 1 schematically illustrates an apparatus 1 according to examples of the disclosure. The example apparatus 1 of FIG. 1 comprises an image source 3 and a plurality of grating areas 9.

It is to be appreciated that only features of the apparatus 1 necessary for the following description have been illustrated in FIG. 1. Other examples may comprise additional features. For instance, in some examples the apparatus 1 may comprise one or more transceivers which may enable the apparatus 1 to receive information which may then be displayed to the user via the image source 3. In some examples the apparatus 1 may comprise controlling circuitry which may be configured to control the information provided by the image source 3.

The example apparatus 1 of FIG. 1 may comprise a near eye display, or other type of display, which may enable an image to be provided proximate to the eye 15 of the user. The apparatus 1 may be configured to provide a user with images which may enable the user to use virtual reality or augmented reality applications or any other suitable application.

In some examples the apparatus 1 may be configured to be worn by the user. For example the apparatus 1 may comprise a mounting portion such as a head piece. The mounting portion may enable the apparatus 1 to be mounted on the head or face of the user. When the apparatus 1 is mounted on the head or face of the user, the user's head or face may support the weight or at least a portion of the weight of the apparatus 1. In some examples the apparatus 1 may comprise ear pieces which may enable the apparatus 1 to be worn as a pair of glasses.

The image source 3 may comprise any means which may be configured to generate an image. In the example of FIG. 1 the image source 3 comprises a display 5 and one or more optical components 7.

The display 5 may comprise any means for providing an image. The display 5 may comprise a transmissive liquid crystal display (LCD) which may be illuminated by a backlight such as a light emitting diode (LED), a reflective liquid crystal on silicon (LCoS) display which may be illuminated using any suitable means, an emissive organic light emitting diode (OLED) display, a scanning LED display or any other suitable means. The display 5 may be configured to display any suitable information and/or images. In some examples the display 5 may be configured to display information and/or images relating to virtual reality or augmented reality applications.

The optical components 7 may comprise any means which may be configured to focus a beam of light 13 originating from or through the display 5. The optical components 7 may be configured to focus or collimate the beam of light 13 before the beam of light 13 is provided to the plurality of grating areas 9. In some examples of the disclosure the optical components 7 may comprise one or more lenses.

In the example figures only one beam of light 13 is shown for clarity. It is to be appreciated that more than one beam of light 13 would be provided by the display 5.

The beam of light 13 is provided from the image source 3 to the plurality of grating areas 9. The plurality of grating areas 9 may be provided on one or more light guides. The grating areas and the light guides may be configured to direct a beam of light 13 from the image source 3 to a position proximate the eye 15 of the user.

The plurality of grating areas 9 and light guides may be configured so that the exit pupil 11 of the apparatus 1 is provided adjacent to the eye 15 of the user. This may enable the user to view an image provided by the image source 3. In some examples the plurality of grating areas may be configured to control the size of the exit pupil, for instance, the plurality of grating areas 9 may comprise one or more exit pupil expanders.

In the example of FIG. 1 the apparatus 1 is configured so that the image source 3 can be moved relative to the plurality of grating areas 9. In some examples the apparatus 1 may comprise a mechanism which may be configured to move the image source 3. For instance the image source 3 may be configured to be moved in the directions indicated by the arrow 17. In some examples the apparatus 1 may comprise a mechanism which may be configured to move one or more of the plurality of grating areas 9.

The image source 3 may be configured to be moved relative to the plurality of grating areas 9 to control the position of the exit pupil 11. This may enable the apparatus 1 to be adjusted so that the exit pupil 11 is adjacent to the pupil for each user. This may enable the apparatus 1 to be used by users with different distances between their pupils.

The apparatus 1 may be configured so that the user can control the position of the image source 3. In some examples the user may be able to move the image source 3 by pushing the image source 3 on a slider or by adjusting other mechanical means such as a screw. In other examples controlling circuitry may be provided which may be configured to provide a control signal to enable motorized adjustment of the position of the image source 3.

FIGS. 2A to 4D illustrate an example apparatus 1 in more detail. FIGS. 2A to 2D illustrate the example apparatus 1 in a first configuration. In the first configuration the apparatus 1 may be arranged so that it is suitable for use by a person with a small distance between their pupils. FIGS. 3A to 3D illustrate the example apparatus 1 in a second configuration. In the second configuration the apparatus 1 may be arranged so that it is suitable for use by a person with an intermediate distance between their pupils. FIGS. 4A to 4D illustrate the example apparatus 1 in a third configuration. In the third configuration the apparatus 1 may be arranged so that it is suitable for use by a person with a large distance between their pupils.

Figure 2A:
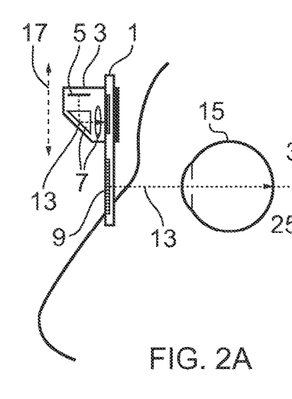
FIGS. 2A to 2D illustrate an apparatus in a first configuration.
Figure 2B:
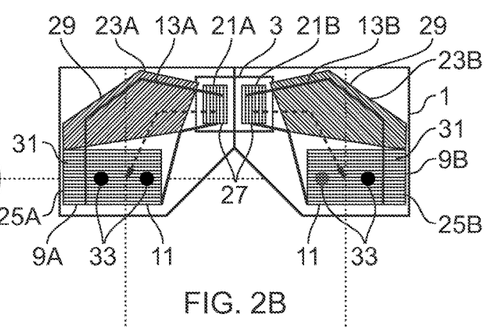
Figure 2C:
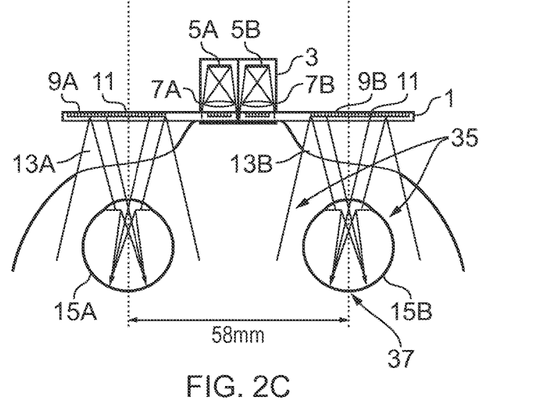
Figure 2D:
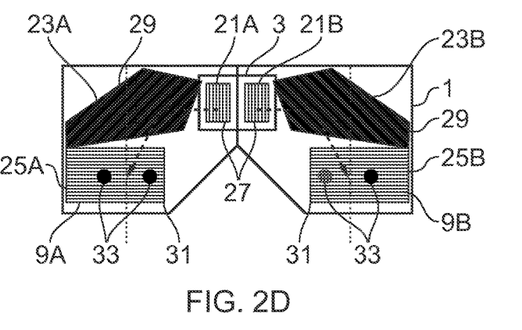
Figure 3A:
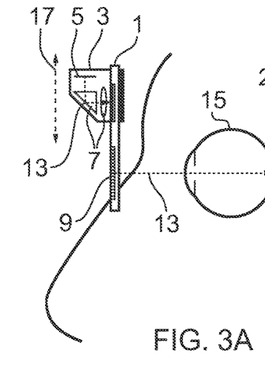
FIGS. 3A to 3D illustrate an apparatus in a second configuration.
Figure 3B:
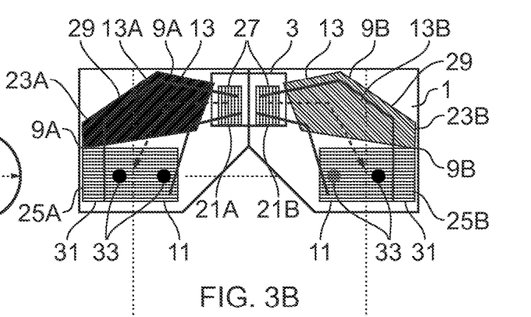
Figure 3C:
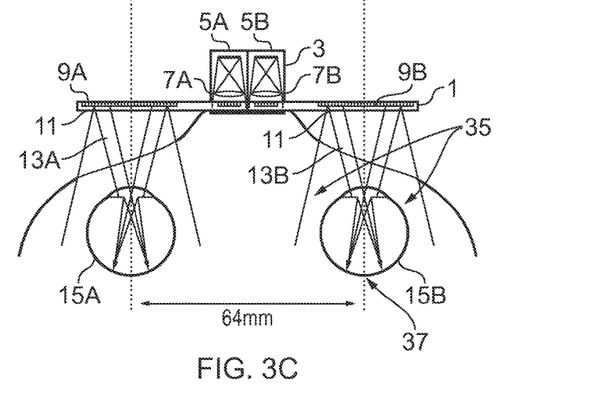
Figure 3D:
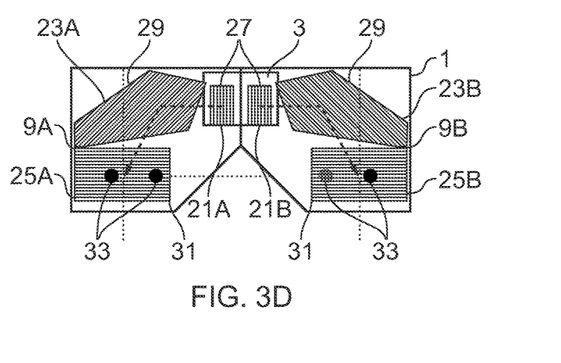
Figure 4A:
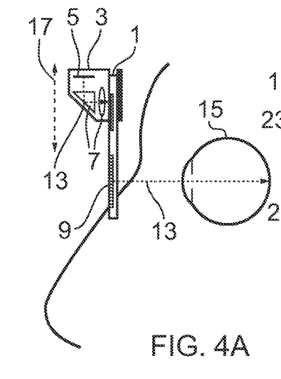
FIGS. 4A to 4D illustrate an apparatus in a third configuration.
Figure 4B:
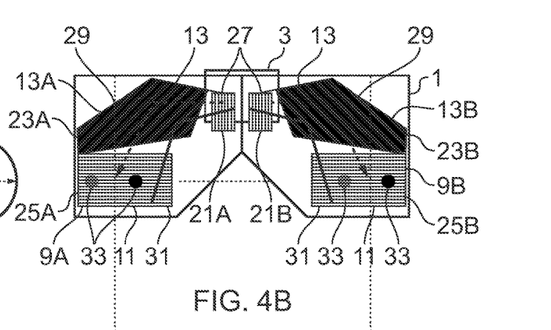
Figure 4C:
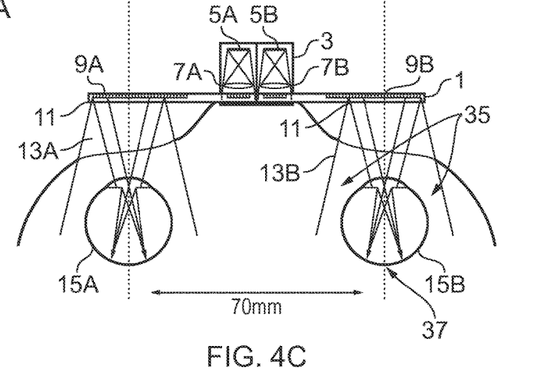
Figure 4D:
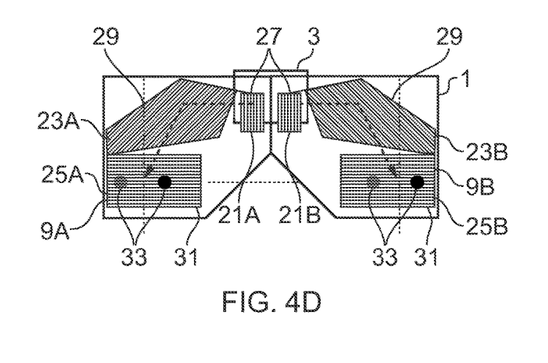

FIGS. 2A, 3A, and 4A illustrate a side cross section of the example apparatus 1. FIGS. 2B, 3B, and 4B illustrate a front cross section of the apparatus 1. FIGS. 2C, 3C, and 4C illustrate a top cross section of the example apparatus 1. FIGS. 2D, 3D, and 4D also illustrate a front cross section of the apparatus 1 however in FIGS. 2D, 3D, and 4D the beam of light 13 passing through the plurality of grating areas 9 is not illustrated for clarity.

The example apparatus 1 of FIGS. 2A to 4D comprises an image source 3 and a plurality of grating areas 9. The image source 3 and a plurality of grating areas 9 may be as described above with reference to FIG. 1. Corresponding reference numerals are used for corresponding features. The example apparatus 1 may be configured to be worn by a user. The example apparatus 1 may be configured to be worn as a pair of glasses or a head set or in any other suitable manner.

In the example apparatus 1 of FIGS. 2A to 4D one image source 3 is provided. The image source 3 may be provided in the centre of the apparatus 1 so that the images from the image source may be provided to both eyes 15 of the user. In the examples of FIGS. 2A to 4D the image source 3 is positioned so that when the user is using the apparatus 1 the image source is located between the two eyes 15 of the user. It can be seen in FIGS. 2C, 3C and 4C that the image sources 3 comprises two displays 5. In the illustrated example the image source 3 comprises a left hand display 5A and a right hand display 5B. The left hand display 5A may be configured to provide images to the left eye 15A of the user and the right hand display 5B may be configured to provide images to the right eye 15B of the user. In the illustrated example both of the display 5A, 5B may be provided in the same image source 3. This may enable the two displays 5A, 5B to be moved simultaneously.

In other examples of the disclosure more than one image source 3 may be provided. For example in some apparatus two image sources 3 may be provided. In such examples a first image source 3 may be configured to provide an image to the left eye 15A and a second image source 3 may be configured to provide an image to the right eye 15B. In such examples the two image sources 3 may be moved independently of each other.

The image source 3 also comprises one or more optical components 7 as described above. In the examples of FIGS. 2A to 4D the optical components 7 comprise one or more components, such as a mirror, which may be configured to reflect the beams of light 13 out of the image source 3 and one or more lenses which may be configured to focus or collimate the beams of light 13.

In the illustrated example the image source 3 comprises a left hand set of optical components 7A and a right hand set of optical components 7B. The left hand set of optical components 7A may be configured to focus a beam of light 13A from the left hand display 5A and the right hand set of optical components 7B may be configured to focus a beam of light 13B from the right hand display 5B.

The image source 3 may be configured to provide the beam of light 13 to a plurality of grating areas 9. In the examples of FIGS. 2A to 4D the apparatus 1 comprises two sets of grating areas 9. A first set of grating areas 9A is configured to provide an image from the left hand display 5A to the left eye 15A of the user and the second set of grating areas 9B is configured to provide an image from the right hand display 5B to the right eye 15B of the user.

In the examples of FIGS. 2A to 4D the apparatus 1 comprises a plurality of grating areas 9. In the example of FIGS. 2A to 2D each set of grating areas comprises three grating areas 9. It is to be appreciated that in other examples a different number of grating areas may be provided.

As can be seen in FIGS. 2D, 3D, and 4D each set of grating areas 9 comprises an in-coupling grating area 21, an intermediate grating area 23 and an out-coupling grating area 25. In some examples the grating areas 9 may comprise diffraction gratings. In other examples the grating areas 9 may comprise surface holograms, prisms or any other suitable means.

The in-coupling grating area may be configured to couple the beam of light 13 from the image source 13 to the plurality of grating areas 9. The in-coupling grating area 21 may be positioned adjacent to the image source 3.

The out-coupling grating area 25 may be configured to enable the beam of light 13 to be coupled out of the plurality of grating areas 9. When the apparatus 1 is in use the out-coupling grating area 25 may be provided adjacent to the eye 15 of the user.

One or more intermediate grating areas 23 may be provided. The intermediate grating area 23 may comprise any means which may be configured to guide the beam of light 13 from the in-coupling grating area 21 to the out-coupling grating area 25. In some examples the intermediate light 23 guide may comprise a horizontal grating area. The horizontal grating area may be configured to guide the beam of light 13 in a horizontal or partially horizontal direction.

In some examples the plurality of grating areas 9 may comprise one or more exit pupil expanders. The exit pupil expanders may be configured to increase the size of the exit pupil 11 before the beam of light 13 exits the apparatus 1.

The exit pupil expanders may comprise one or more diffraction gratings 27, 29, 31. The diffraction gratings 27, 29, 31 are indicated by the lined areas in FIGS. 2D, 3D, and 4D. The diffraction gratings 27, 29, 31 may comprise any suitable periodic structure. The first diffraction grating 27 may be an in-coupling grating which couples the incident beam of light 13 into the plurality of grating areas 9. The second diffraction grating 29 may comprise an intermediate diffraction grating which may be configured to direct the beam of light 13 towards the third diffraction grating 31. The third diffraction grating 31 may be an out-coupling grating which couples the incident beam of light 13 out of the plurality of grating areas 9.

One or more of the diffraction gratings 27, 29, 31 may increase the size of the exit pupil 11 of the beam of light 13. For instance the first diffraction 27 grating 27 may expand the exit pupil 11 in a vertical direction and the second diffraction grating 29 may expand the exit pupil 11 in a horizontal direction.

The in-coupling grating area 21 may be configured so that the beam of light 13 from the image source 3 is only incident on a portion of the in-coupling grating area 21. The surface area of the in-coupling grating area 21 may be larger than the exit pupil of the beam of the light 13 when the beam of light 13 is incident on the in-coupling grating area 21. This can be seen in FIGS. 2B, 3B and 4B where the shaded area which represents the beam of light 13 only covers a portion of the in-coupling grating area 21.

The out-coupling grating area 25 may be configured so that the exit pupil 11 of the apparatus 1 only comprises a portion of the out-coupling grating area 25. The surface area of the out-coupling grating area 25 may be larger than the exit pupil 11 of the beam of the light 13 when the beam of light 13 exits the apparatus. This can be seen in FIGS. 2B, 3B and 4B where the shaded area which represents the beam of light 13 only covers a portion of the out-coupling grating area 25.

In examples of the disclosure the image source 3 may be configured to be moved relative to the plurality of grating areas 9. The image source 3 may be configured to be moved in a vertical direction as indicated by the arrow 17. Different positions of the image source 3 are illustrated in FIGS. 2A to 4D.

A mechanism may be provided to enable the image source 3 to be moved. The mechanism may comprise a slide mechanism, a drive mechanism or any other suitable mechanism.

In some examples the image source 3 may be configured so that the user of the apparatus 1 can adjust the position of the image source 3. This may enable the user of the apparatus 1 to adjust the apparatus 1 so that the exit pupil 11 is aligned with their own eyes.

In the example apparatus 1 of FIGS. 2A to 4D the image source 3 is configured to move so that the portion of the in-coupling grating area 27 upon which the beam of light 13 is incident can be changed. The path followed by the beam of light 13 through the plurality of grating areas 9 is determined by the portion of the in-coupling grating area 21 that the beam 13 was incident upon. By moving the image source 3 relative to the plurality of grating areas 9 the path followed by the beam of light 13 through the plurality of grating areas 9 can be changed. The path followed by the beam of the light 13 through the plurality of grating areas 9 determines the position of the exit pupil. Therefore by moving the image source 3 relative to the plurality of grating areas 9 the position of the exit pupil 11 may be adjusted.

In some examples the image source 3 may be moveable between a first position and a second position such that when the image source 3 is in the first position a beam of light 13 is incident on a first portion of the in-coupling grating area 21 and when the image source 3 is in the second position the beam of light 13 is incident on a second portion of the in-coupling grating area 21. The second portion of the in-coupling grating area 21 may be different to the first portion of the in-coupling grating area 21. This may enable the apparatus 1 to be used to control the position of the exit pupil 11.

In FIGS. 2A to 2D the apparatus 1 is in a first configuration in which the apparatus 1 is arranged so that it is suitable for use by a person with a small distance between their pupils. In the example of FIGS. 2A to 2D the distance between the pupils is 58 mm.

In this example the image source 3 is provided in a first position. When the image source 3 is provided in the first position the beam of light 13 is incident on the lower portion of the in-coupling grating area 21. When the image source 3 is provided in the first position the exit pupils 11 are provided towards the centre of the apparatus 1. For the left hand set of grating areas 9A the exit pupil 11 is provided at the right hand edge of the out-coupling grating area 25A. For the right hand 25B set of grating areas the exit pupil 11 is provided at the left hand edge of the out-coupling grating area 25B.

Only light which exits the grating areas 9 from certain areas enters the eye of the user. These areas are represented by the dots 33 in FIGS. 2B and 2D. It can be seen in FIG. 2D that there is good alignment between the exit pupil and the eyes 15 of the user. This reduces or minimizes the amount of light which is wasted. The portion of the beam of light which is not incident on the user's eyes 35 is wasted.

In FIGS. 3A to 3D the apparatus 1 is illustrated in a second configuration in which the apparatus 1 is arranged so that it is suitable for use by a person with an intermediate distance between their pupils. In the example of FIGS. 3A to 3D the distance between the pupils is 64 mm.

In this example the image source 3 is provided in a second position. When the image source 3 is provided in the second position the beam of light 13 is incident on a mid-portion of the in-coupling grating area 21. When the image source 3 is provided in the second position the exit pupils 11 are provided towards the middle of the out-coupling grating areas 25.

The dots 33 in FIGS. 3B and 3D show the areas of the grating areas 9 from which light enters the eyes 15. It can be seen in FIG. 3D that the exit pupil 11 has been adjusted so that there is good alignment between the exit pupil and the eyes 15 of the user. This means that there is very little light wasted in the second configuration.

In FIGS. 4A to 4D the apparatus 1 is in a third configuration in which the apparatus 1 is arranged so that it is suitable for use by a person with a large distance between their pupils. In the example of FIGS. 4A to 4D the distance between the pupils is 70 mm.

In this example the image source 3 is provided in a third position. When the image source 3 is provided in the third position the beam of light 13 is incident on the upper portion of the in-coupling grating area 21. When the image source 3 is provided in the third position the exit pupils 11 are provided towards the outer edges of the apparatus 1. For the left hand set of grating areas 9A the exit pupil 11A is provided at the left hand edge of the out-coupling grating area 25A. For the right hand 25B set of grating areas the exit pupil 11B is provided at the right hand edge of the out-coupling grating area 25B.

The dots 33 in FIGS. 4B and 4D show the areas of the grating areas 9 from which light enters the eyes 15. It can be seen in FIG. 4D that the exit pupil 11 has been adjusted so that there is good alignment between the exit pupil and the eyes 15 of the user. This means that there is also very little light wasted in the third configuration.

It is to be appreciated that other arrangements of the apparatus 1 may be provided in different exampled. For instance, in the examples described above and illustrated in FIGS. 2A to 4D the grating areas 9 are designed so that the out-coupling position of the beam of light 13 moves outwards as the image source 3 is moved downwards. In other examples this may be inverted so that the out-coupling position of the beam of light 13 may move inwards as the image source 3 is moved downwards. In such examples when the image source 3 is in the lowest position, as illustrated in FIGS. 4A to 4D, the grating areas 9 may be arranged to enable the apparatus 1 to be suitable for use by a person with a small distance between their pupils. Conversely when the image source 3 is in the highest position, as illustrated in FIGS. 2A to 2D, the grating areas 9 may be arranged to enable the apparatus 1 to be suitable fo use by a person with a large distance between their pupils.

Figure 5:
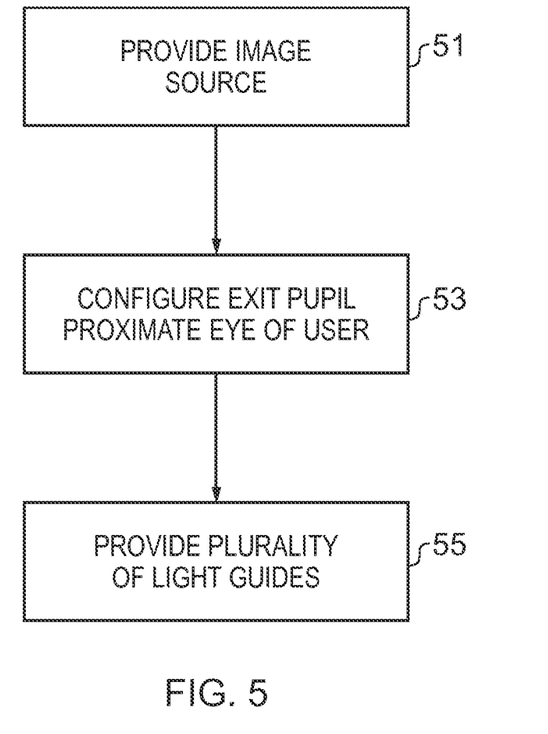
FIG. 5 illustrates a method.

FIG. 5 illustrates a method. The method of FIG. 5 may be used to provide an apparatus 1 as described above with reference to FIGS. 1 to 4D.

The method comprises, at block 51, providing an image source. The method also comprises, at block 53, configuring an exit pupil 11 to be positioned proximate to an eye of a user to enable a user to view an image from the image source 3. The method also comprises, at block 55, providing a plurality of grating areas 9 between the image source 1 and the exit pupil 11 wherein the plurality of grating areas 9 are configured to direct beams of light 13 from the image source 3 to the exit pupil 11. The image source 3 may be configured to be moved relative to the plurality of grating areas 9 to control the position of the exit pupil relative 11 to the eye 15 of the user.

Examples of the disclosure provide an apparatus 1 such as a near eye display which can be easily adjusted for use by users. This enables the apparatus 1 to be used by users with different distances between their pupils.

The apparatus 1 enables the exit pupils 11 to be aligned with the eyes of the user. This reduces the amount of light which is emitted by the apparatus 1 and which is not incident on the eyes 15 of the user. This provides for a more efficient apparatus 1.

In the examples of the disclosure the apparatus 1 may be configured so that the gratings areas 9 may be fixed in position relative to each other. For instance the intermediate grating area 23 may be fixed in position relative to the out-coupling grating area 25. The position of the exit pupils 11 may be adjusted just by moving the image source 3 relative to the grating areas 9. This may make it easier for a user to adjust the apparatus 1 themselves. This may also make the apparatus 1 simpler to manufacture as it keeps the number of moving parts to a minimum.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the disclosure have been described in the preceding paragraphs with reference to various examples, it should be appreciated that modifications to the examples given can be made without departing from the scope of the invention as claimed. For instance, in the above described examples the image source 3 is configured to be moved in the direction of the arrows 17. This enables the image source 3 to be moved relative to the plurality of grating areas 9. In other examples the plurality of grating areas 3 may be configured to be moved. The plurality of grating areas 3 may be configured to be moved while the image source 3 does not move. In such examples the apparatus 1 may comprise a mechanism which enables the plurality of grating areas to be moved.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   an image source;
   a first exit pupil and a second exit pupil, said first and second exit pupils being separated from one another by an adjustable distance in a first direction, said first pupil and said second pupil being provided to enable a user to view an image from the image source with a left eye and a right eye, respectively, said adjustable distance being provided to accommodate the apparatus to a separation between the left eye and the right eye of the user; and
   a first plurality of grating areas between the image source and the first exit pupil, and a second plurality of grating areas between the image source and the second exit pupil, wherein the first plurality of grating areas directs beams of light from the image source to the first exit pupil, and the second plurality of grating areas directs beams of light from the image source to the second exit pupil, and wherein each of said pluralities of grating areas includes an in-coupling grating area and an out-coupling grating area;
   wherein the image source is movable relative to the in-coupling grating areas of the first and second pluralities of grating areas in a second direction perpendicular to said first direction of separation between said first exit pupil and said second exit pupil to cause light from said image source to enter the in-coupling grating areas of said first plurality of grating areas and said second plurality of grating areas at selected positions so as to exit said out-coupling grating areas at said first and second exit pupils separated from one another by a distance corresponding to the separation between the left eye and the right eye of the user.

2. The apparatus as claimed in claim 1, wherein beams of light from the image source are only incident on portions of the in-coupling grating areas.

3. The apparatus as claimed in claim 2, wherein the first and second exit pupils are only portions of the out-coupling grating areas.

4. The apparatus as claimed in claim 2, wherein the image source is movable between a first position and a second position, whereby, when the image source is in the first position, a beam of light from the image source is incident on first portions of the in-coupling grating areas, and, when the image source is in the second position, the beam of light is incident on second portions of the in-coupling grating areas, wherein the second portions of the in-coupling grating areas are different from the first portions of the in-coupling grating areas.

5. The apparatus as claimed in claim 4, wherein a path followed by a beam of light through the pluralities of grating areas is determined by the portions of the in-coupling grating areas that the beam of light is incident upon.

6. The apparatus as claimed in claim 5, wherein the positions of the first and second exit pupils are determined by the path followed by the beam of light through the pluralities of grating areas.

7. The apparatus as claimed in claim 1, further comprising at least one intermediate grating area between each of the in-coupling grating areas and the out-coupling grating areas.

8. The apparatus as claimed in claim 7, wherein the intermediate grating areas are fixed in position relative to the out-coupling grating areas.

9. The apparatus as claimed in claim 1, further comprising a mechanism for moving the image source.

10. The apparatus as claimed in claim 1, further comprising a mechanism for moving at least one of the plurality of grating areas.

11. The apparatus as claimed in claim 1, wherein the first and second pluralities of grating areas include at least one diffraction grating.

12. The apparatus as claimed in claim 11, wherein the first and second pluralities of grating areas are provided on at least one exit pupil expander.

13. A method comprising:
providing an image source;
providing a first exit pupil and a second exit pupil, said first and second exit pupils being separated from one another by an adjustable distance in a first direction, said first pupil and said second pupil being provided to enable a user to view an image from the image source with a left eye and a right eye, respectively, said adjustable distance being provided to accommodate the apparatus to a separation between the left eye and the right eye of the user; and
providing a first plurality of grating areas between the image source and the first exit pupil, and a second plurality of grating areas between the image source and the second exit pupil, wherein the first plurality of grating areas directs beams of light from the image source to the first exit pupil, and the second plurality of grating areas directs beams of light from the image source to the second exit pupil, and wherein each of said pluralities of grating areas includes an in-coupling grating area and an out-coupling grating area;
wherein the image source is movable relative to the in-coupling grating areas of the first and second pluralities of grating areas in a second direction perpendicular to said first direction of separation between said first exit pupil and said second exit pupil to cause light from said image source to enter the in-coupling grating areas of said first plurality of grating areas and said second plurality of grating areas at selected positions so as to exit said out-coupling grating areas at said first and second exit pupils separated from one another by a distance corresponding to the separation between the left eye and the right eye of the user.

14. The method as claimed in claim 13, wherein beams of light from the image source are only incident on portions of the in-coupling grating areas.

15. The method as claimed in claim 14, wherein the first and second exit pupils are only portions of the out-coupling grating areas.

16. The method as claimed in claim 13, wherein the image source is movable between a first position and a second position, whereby, such that when the image source is in the first position, a beam of light from the image source is incident on first portions of the in-coupling grating areas, and, when the image source is in the second position, the beam of light is incident on second portions of the in-coupling grating areas, wherein the second portions of the in-coupling grating areas are different from the first portions of the in-coupling grating areas.

17. The method as claimed in claim 16, wherein a path followed by a beam of light through the pluralities of grating areas is determined by the portions of the in-coupling grating areas that the beam of light is incident upon.

18. The method as claimed in claim 13, further comprising providing a mechanism for moving the image source.

19. The method as claimed in claim 13, further comprising providing a mechanism for moving at least one of the plurality of grating areas.

* * * * *